United States Patent [19]
Kornestedt et al.

[11] Patent Number: 6,021,329
[45] Date of Patent: Feb. 1, 2000

[54] METHOD, AND ASSOCIATED APPARATUS, FOR DETERMINING CELL RELATIONSHIPS IN A RADIO COMMUNICATION SYSTEM

[75] Inventors: Carl Fredric Ulf Kornestedt, Stockholm; Ulf Forssén, Saltsjö-Boo; Sören Andersson, Stockholm, all of Sweden

[73] Assignee: Telefonaktie Bolaget LM Ericsson (publ), Stockholm, Sweden

[21] Appl. No.: 08/847,540

[22] Filed: May 1, 1997

[51] Int. Cl.[7] .................................................. H04Q 7/20
[52] U.S. Cl. ......................... 455/446; 455/447; 455/562; 455/448; 455/449
[58] Field of Search .................................... 455/446, 447, 455/448, 449, 423, 424, 561, 562, 63, 450

[56] References Cited

U.S. PATENT DOCUMENTS

| | | | |
|---|---|---|---|
| 5,247,699 | 9/1993 | Hartman | 455/447 |
| 5,293,640 | 3/1994 | Gunmar et al. | 455/33.1 |
| 5,590,399 | 12/1996 | Matsumoto et al. | 455/33.3 |
| 5,649,292 | 7/1997 | Doner | 455/447 |
| 5,802,473 | 9/1998 | Rutledge et al. | 455/441 |
| 5,809,401 | 9/1998 | Meidan et al. | 455/446 X |
| 5,818,385 | 10/1998 | Bartholomew | 455/419 |

FOREIGN PATENT DOCUMENTS

| | | |
|---|---|---|
| 0 490 554 A2 | 2/1991 | European Pat. Off. . |
| 0 490 554 A2 | 6/1992 | European Pat. Off. . |
| 2 269 298 | 2/1994 | United Kingdom . |
| WO 96/38011 | 11/1996 | WIPO . |
| WO 96/38011 | 12/1996 | WIPO . |

*Primary Examiner*—Wellington Chin
*Assistant Examiner*—Yemane Woldetatios
*Attorney, Agent, or Firm*—Jenkens & Gilchrist

[57] ABSTRACT

A method, and associated apparatus, for determining cell relationships in a radio communication system, such as a cellular communication system. The cell relationships describe how communications in a cell are disturbed by communications in other cells. The cell relationships are used, for example, in frequency planning procedures and procedures by which to determine neighbor cell lists.

23 Claims, 4 Drawing Sheets

METHOD, AND ASSOCIATED APPARATUS, FOR DETERMINING CELL RELATIONSHIPS IN A RADIO COMMUNICATION SYSTEM

The present invention relates generally to a radio communication system in which directional antennas are utilized to effectuate communications between sending and receiving stations. More particularly, the present invention relates to a method, and associated apparatus, for determining cell relationships between cells defined in the radio communication system. Cell relationships describe how communications in a cell are disturbed by communications in other cells. The cell relationships are used, for example, in frequency planning procedures used to allocate frequencies to be used for communications in respective ones of the cells.

When determining the cell relationships, the traffic distribution in the cells, indicated by how often the antenna beam patterns are used to effectuate communications therein, is considered. The determined cell relationships thereby provide an accurate representation of the likelihood that communications in one cell shall disturb communications in other cells. And, when the cell relationships are used in frequency planning procedures, allocation of frequencies can be made to efficiently utilize the frequencies available for communications in the communication system.

BACKGROUND OF THE INVENTION

Advancements in communication technologies have permitted the creation and popularization of usage of cellular communication systems. The infrastructures of such communication systems have been installed throughout large geographical areas, and cellular communications are permitted by users within the areas encompassed by the cellular infrastructure.

The network infrastructure of a cellular communication system includes a plurality of spaced-apart radio base stations positioned at spaced intervals about a geographical area to be encompassed by the cellular system. Because the plurality of radio base stations are positioned at spaced intervals throughout the geographic area, communication signals, both downlink signals generated by a radio base station and uplink signals generated by a mobile terminal, need only be of only relatively low power levels to effectuate communications between a mobile terminal and a radio base station.

A significant advantage inherent of a cellular communication system is the ability to "re-use" the frequencies allocated to the cellular communication system. Because the communication signals are of relatively low power levels, the same frequencies can be allocated for communications in different ones of the cells of the communication system. That is to say, the same frequency can be used concurrently at a plurality of locations throughout the geographical area encompassed by the cellular communication system to permit a plurality of different communications between a plurality of different users to be concurrently effectuated.

The cells in which communications are effectuated at the same frequencies must be carefully selected so that concurrent generation of communication signals in the various cells do not interfere significantly with one another. If the frequencies are re-used at locations which are too close to one another, interference between the concurrently-transmitted signals on the same frequencies might result.

As usage of cellular communication systems have increased, capacity problems have, however, sometimes been evidenced. Proposals have been set forth to provide the various manners by which to increase the communication capacity of a cellular communication system.

Proposals have been set forth, for instance, to utilize adaptive antennas capable of creating directional antenna beam patterns. Base stations conventionally utilize antennas which form wide, non-changeable antenna lobes of, e.g., 120° or 360°. A base station transmits downlink signals to mobile stations and receives uplink signals from the mobile stations within the area encompassed by the antenna lobe. In contrast, an adaptive antenna is capable of forming a directional antenna beam pattern which encompasses an area smaller than the area typically encompassed by the antenna lobe formed by the antenna of a conventional base station. By utilizing antenna apparatus capable of forming directional antenna beam patterns, it is possible to increase the capacity of communications in either of at least two manners.

The frequency re-use distance can be decreased as the use of a directional antenna permits better suppression of unwanted signals from interfering with the transmission of desired communication signals. By decreasing the re-use distance, the frequencies available to the cellular communication system are used more frequently.

Capacity can also be increased by forming two or more non-overlapping antenna beam patterns within a single cell, thereby to permit concurrent communications to two or more mobile terminals within a single cell at the same frequency.

Frequency planning procedures are carried out to assign frequencies to the cells defined in the cellular communication system. In a frequency planning procedure for a conventional cellular communication system in which base stations have antenna apparatus which generate only single antenna patterns, traffic behavior in the cells need not be considered. Viz., communication signals communicated between the base station and the mobile terminal is distributed throughout the entire cell. Therefore, traffic behavior in the cell need not be taken into account when frequency planning procedures are undertaken. However, if the base stations instead utilize antenna apparatus capable of generating directional antenna beam patterns, traffic distribution must be considered when frequency planning procedures are undertaken.

As existing frequency planning procedures generally do not take into account traffic behavior and distribution, such existing frequency planning procedures shall be unable to adequately allocate frequencies in an optimal manner.

It is in light of this background information related to cellular communication systems and frequency planning procedures therefor that the significant improvements of the present invention have evolved.

SUMMARY OF THE INVENTION

The present invention, accordingly, advantageously provides a method, and an associated apparatus, for determining cell relationships between cells defined in a radio communication system which utilizes directional antennas. The cell relationships can be used to allocate frequencies pursuant to frequency planning procedures in which frequencies are assigned to the cells.

Traffic distribution in the cells is considered when determining the cell relationships. Because such traffic distribution is considered, the determined cell relationships provide an accurate representation of the likelihood that communications in one cell shall disturb communications in other cells. Allocation of the frequencies to the cells during frequency planning procedures can thereby be made to utilize efficiently the frequencies available for communications in the radio communication system.

In one aspect of the present invention, cell relationships which describe how communications in a cell are disturbed by communications in other cells are calculated. To determine such cell relationships, measurements of actual traffic distributions within each cell of the communication system are made. Indications of the traffic distribution within a cell are evidenced by how often a particular antenna beam pattern is formed within the cell. A probability vector is formed which denotes the probability of utilization of a particular antenna beam pattern in a particular cell. A probability vector is thereby associated with each cell and, hence, base station of the radio communication system.

Pixels forming measuring locations are defined throughout the geographical area encompassed by the radio communication system. Signal strength levels of downlink signals generated by the base stations of the communication system are measured. A pixel can, for example, be associated to the cell which generates the greatest signal power when detected at the pixel. Carrier-to-interference vectors are then calculated for each interfering signal generated by each of the other base stations. Separate vector elements are calculated for each of the antenna beam patterns pursuant to which downlink signals are transmitted by such base stations.

Service probabilities are further associated with each of the measuring locations. Such service probabilities are of values responsive to environmental characteristics associated with the measuring locations. For instance, measuring locations positioned in urban areas are generally considered to carry more traffic than measuring locations positioned in rural areas. Cell relationships are established responsive to the carrier-to-interference and service probability values associated with pixels associated with cells.

In another aspect of the present invention, the antenna beam patterns formed by antenna apparatus of the base stations of the communication system are dynamically formed. Measurements of actual traffic distribution within the various cells which are made responsive to the antenna beam patterns formed by the base stations are also considered by considering the possible antenna beam patterns which can be taken by the antenna apparatus of the base stations.

In these and other aspects, therefore, a method, and an associated apparatus, determines cell relationships in a radio communication system. The radio communication system includes a plurality of radio base stations spaced-apart throughout a geographical area. Each base station defines a cell and at least one of the base stations is capable of generating a downlink signal broadcast pursuant to an antenna beam pattern. At least one base station is further capable of forming a selected number of directional antenna beam patterns throughout which the downlink signal is selectively broadcast. The geographical area further has a plurality of measuring locations defined throughout. Probabilities of formation of each of the selected number of directional antenna beam patterns capable of being formed at each of the base stations are determined. Each of the measuring locations is associated with a base station. The downlink signal generated by the base station to which each of the measuring locations, respectively, is associated forms a desired carrier signal associated with each respective measuring location. Downlink signals are generated by others of the base stations form interfering signals at the respective measuring locations. A carrier signal quality indication is calculated relative to each interfering signal detected at each measuring location. A separate value is calculated for each of the antenna beam patterns throughout which each of the interfering signals is broadcast. Service probability values are determined at each measuring location. The service probability values indicate probabilities that the desired carrier signal associated therewith is broadcast to the measuring location. Cell relationships are established between the cells of the radio communication system responsive to values of the carrier signal quality indication and the service probability values.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
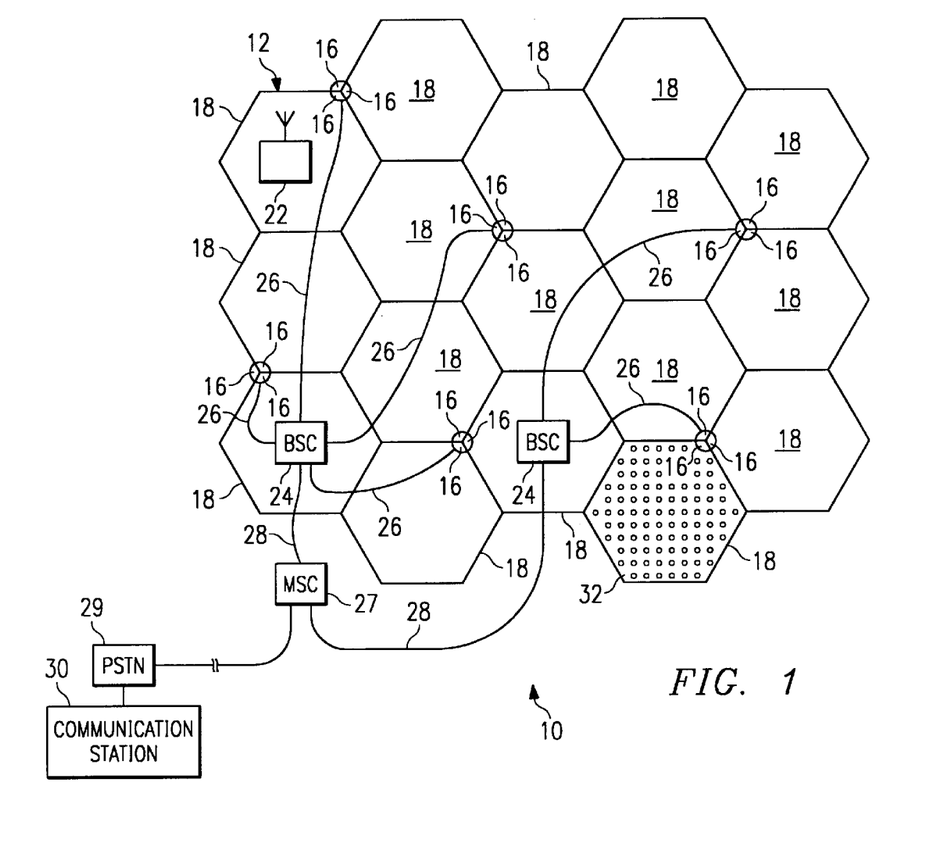
FIG. 1 illustrates a plan view of a portion of a cellular communication system for which the method and apparatus of an embodiment of the present invention can be carried out.

Referring first to FIG. 1, a portion of a cellular communication system, shown generally a 10, is illustrated. While the following description shall describe operation of a conventional, terrestrial cellular communication system, such as a GSM (Global System for Mobile Communications) system, the system 10 is similar exemplary of other types of radio communication systems.

The cellular communication system 10 is formed by positioning a plurality of base stations 16 at spaced-apart positions throughout a geographical area which is to be encompassed by the communication system 10. In the communication system 10 shown in FIG. 1, groups of three base stations 16 are co-located. Each of the base stations 16 defines a cell 18, here shown, for purposes of illustration, to be of generally hexagonal configurations. Each of the base stations 16 typically includes fixed-site transceivers which permit wireless communications to be effectuated with remotely-positioned mobile terminals, such as the exemplary mobile terminal 22 when the mobile terminal is positioned within communication range of respective ones of the base stations.

Groups of the base stations 16 are coupled to base station controllers (BSCs) 24. Lines 26 couple the base stations 16 to the (BSCs) 24. The BSCs 24 are coupled to mobile switching centers (MSCs), such as the MSC 27, by way of lines 28. The MSCs, of which one MSC is illustrated in FIG. 1, are coupled to a public switched telephone network (PSTN) 29.

The PSTN is coupled, in turn, to other communication stations of which the communication station 30 is exemplary. The communications station 30 may, for example, be formed of a wireline, telephonic device or other device, such as mobile terminal, analogous to the mobile terminal 22.

As mentioned previously, cellular communication systems re-use frequencies in various cells throughout the system. As relatively low-power signals are communicated between a mobile terminal and radio base station, the same frequencies can be re-used concurrently in different cells. Concurrently-transmitted signals between separate mobile terminals and separate base stations can be communicated as long as such concurrently-transmitted communication signals do not interfere significantly with one another. Care must be taken, however, when allocating frequencies to the various base stations, and cells defined therefrom. Allocation of the frequencies must be made such that concurrent communications can be effectuated without permitting significant levels of interference to be introduced by the concurrent transmission. The frequency allocations must further be made in a manner to efficiently utilize the frequencies available to the communications system.

When commencing operations to determine cell relationships used in the allocation of frequencies to the cells, measuring locations which form pixel points are defined throughout the geographical area encompassed by the cellular communication system. Points 32 illustrated in one of the cells are representative of such measuring locations. While not separately illustrated, such measuring locations are similarly established in other cells 18.

An embodiment of the present invention facilitates such frequency allocation by providing indications of disturbances introduced upon communications in a cell, caused by communications in other cells. It should be noted that exemplary operation described below is with respect to detection of downlink signals generated by radio base stations. In other embodiments, analogous operation utilizes uplink signals generated by mobile terminals or co- or adjacent-channel signal measurements. Such indications define cell relationships between the cells. The cell relationships take into account signal characteristics generated by radio base stations having antenna apparatus capable of forming narrow lobe antenna beam configurations.

Figure 2A:
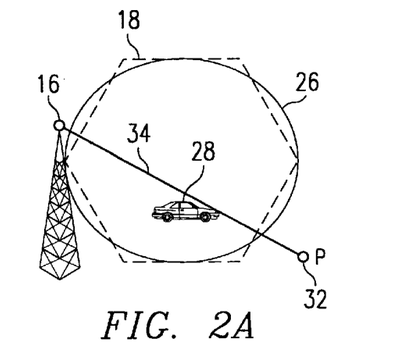
FIGS. 2A and 2B illustrate a single cell of the cellular communication system shown in FIG. 1 and an antenna beam pattern exhibiting a wide lobe formed by antenna apparatus of a radio base station in two separate traffic situations.

FIG. 2 illustrates a single cell 18, exemplary of any of the cells 18 shown in FIG. 1. The radio base station 16 which defines the cell 18 is further shown in the figure. The radio base station 18 here includes antenna apparatus capable of forming a wide lobe antenna beam pattern 26. The antenna beam pattern 26 substantially encompasses the cell 18 such that downlink signals broadcast by the radio base station 16 are broadcast throughout the entire cell 18.

A mobile terminal, here a mobile terminal positioned within a vehicle 28 positioned anyplace within the cell 18 is able to detect downlink signals broadcast thereto by the radio base station 16 and also to transmit uplink signals to the radio base station 16.

The signal energies of the downlink signals broadcast by the radio base station 16 shown in FIG. 2A are of magnitudes dependent upon the distance of the measuring location from the radio base station. As the antenna beam pattern 26 encompasses the entire cell 18, the antenna beam pattern and the signal energy of the downlink signal beyond the cell is not dependent upon the position of the mobile terminal within the cell. Residual signal energy levels of the downlink signal beyond the cell 18 are similarly unaffected by the position of the mobile terminal within the cell 18.

For instance, the signal energy of a downlink signal broadcast by the radio base station 16 measured at a measuring location 32 beyond the cell 18 is dependent upon the distance of the measuring location 32 from the radio base station 16, here a distance indicated by the range segment 34.

The mobile-terminal-carrying vehicle 28 is also positioned along the range segment 34. As a downlink signal is broadcast throughout the entire cell 18, however, the residual signal energy detected at the measuring location 32 is not dependent upon the position of the mobile terminal-carrying vehicle 28 within the cell 18.

FIG. 2B again illustrates the radio base station 16 having the antenna apparatus which forms the wide lobe antenna beam pattern 26. The measuring location 32 separated from the radio base station 16 by a distance indicated by the range segment 34 is also again illustrated in the Figure.

Figure 2B:
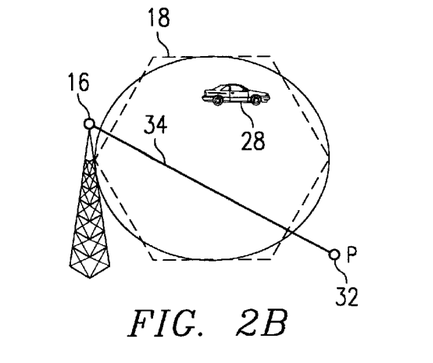

Here, the vehicle 28 within which the mobile terminal is located is positioned at a different location within the cell 18. That is to say, the vehicle 28 is positioned at a location other than along the range segment 34 extending between the radio base station 16 and the measuring location 32. However, the signal energy of a downlink signal broadcast by the radio base station 16 to the mobile terminal carried within the vehicle 28, when detected at the measuring location 32, is the same as the signal energy, detected at the measuring location 32, when the vehicle 28 is positioned along the range segment 34, as illustrated in FIG. 2A.

When establishing cell relationships between cells in a system, in which only non-changing, wide lobe antenna beam patterns are formed, consideration need not be given to traffic distribution patterns within a cell 18. The residual signal energy of the downlink signal is broadcast by a radio base station having antenna apparatus which generates a wide lobe are not dependent upon the location of a mobile terminal. Therefore, when establishing the cell relationships, traffic distribution within the cell need not be considered.

FIGS. 3A and 3B again illustrate a radio base station 16 and cell 18 defined therefrom. Here, the antenna apparatus of the radio base station 16 is capable of generating narrow lobe, antenna beam patterns.

Figure 3A:
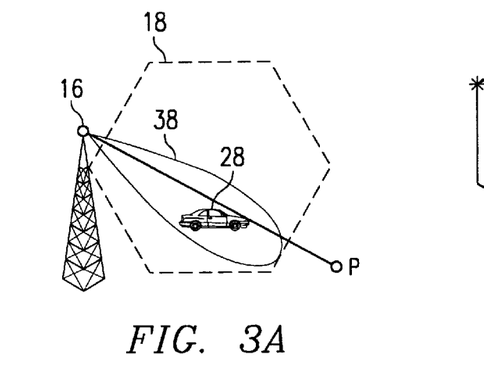
FIGS. 3A and 3B illustrate a single cell of the cellular communication system, similar to that shown in FIGS. 2A and 2B, but wherein the antenna beam pattern exhibits a narrow lobe.

FIG. 3A illustrates a narrow lobe, antenna beam pattern 38 elongated in a longitudinal direction extending radially outwardly from the radio base station 16 such that the antenna beam pattern 38 encompasses the position in which the mobile-terminal-containing vehicle 28 is positioned. In FIG. 3A, the vehicle 28 is positioned at a location identical to the positioning of the vehicle 28 in the illustration 2A, viz., along the range segment 34.

Downlink signals broadcast by the radio base station 16 to the mobile terminal positioned within the vehicle 28 are broadcast throughout the area encompassed by the antenna beam pattern 38. Residual energy levels of the downlink signals can be measured at the measuring locations of which the measuring location 32, separated from the radio base station by the length of the range segment 34, is exemplary.

FIG. 3B again illustrates the radio base station having an antenna apparatus capable of generating a directional, narrow lobe, antenna beam pattern. Here, however, the mobile-terminal-containing vehicle 28 is repositioned to be away from the range segment 34. Here, the vehicle is positioned at the location corresponding to the positioning of the vehicle illustrated in FIG. 2B. And, the antenna beam pattern 42 is formed to effectuate communications with the mobile terminal.

Figure 3B:
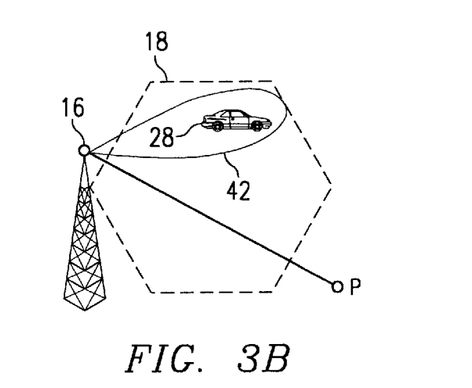

Because the radio base station 16 here contains antenna apparatus capable of forming narrow lobe antenna beam patterns, the residual signal energy detected at the measuring location 32 is dependent upon the direction in which the antenna beam pattern extends. When the antenna beam pattern 38 shown in FIG. 3A is formed, the residual signal energy of downlink signals broadcast by the radio base station are of higher levels when detected at the measuring location 32 than when the antenna apparatus forms the antenna beam pattern 42.

Therefore, the position of the mobile terminal, i.e., the traffic distribution which is determinative of the selection of the antenna beam patterns should be considered when establishing cell relationships between the cells of a cellular communication system. An embodiment of the present invention permits consideration of such traffic distribution in the calculation of cell relationships.

Figure 4:
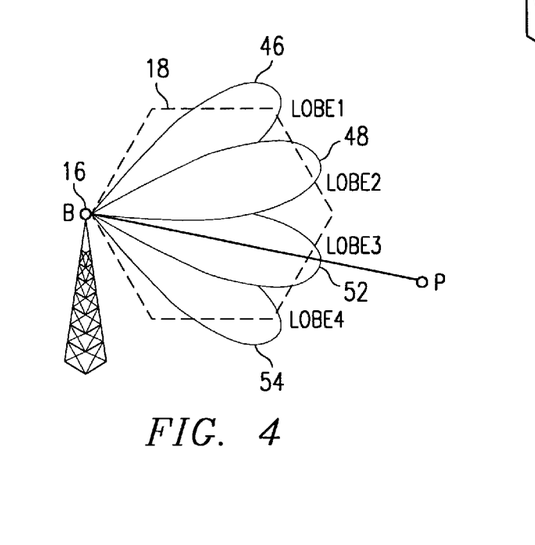
FIG. 4 illustrates a single cell of a cellular communication system, similar to that shown in FIGS. 2A–B and 3A–B, but here illustrating four separate antenna beam patterns formed of four separate lobes, formed by antenna apparatus of a radio base station.

FIG. 4 illustrates an exemplary series of antenna beam patterns capable of being generated by an adaptive antenna ray forming a portion of a radio base station. Here, again, a radio base station 16 and the cell 18 defined therefrom are shown. The radio base station 16 includes the antenna apparatus, such as an antenna array utilizing a Butler matrix.

The antenna array is capable of forming any of four antenna beam patterns, here antenna beam patterns 46, 48, 52, and 54. The antenna beam patterns 46–54 each form elongated, narrow lobe, antenna beam patterns. The coverage areas of the respective antenna beam patterns together substantially encompass the area of the cell 18. Because of the directional nature of each of the antenna beam patterns, downlink signals can be broadcast to a mobile terminal with less interference introduced upon the downlink signal due to the directional nature of the antenna beam patterns. Also, separate downlink signals can be broadcast to two or more mobile terminals concurrently within a single cell through the utilization of directional antenna beam patterns.

In the exemplary illustration of FIG. 4, the antenna beam patterns 46–54 are fixed in configuration. In other embodiments, adaptive antenna arrays are utilized to permit additional numbers of antenna beam patterns to be formed. The following description of an exemplary embodiment of the present invention by which to establish cell relationships between cells of the cellular communication system shall be described with respect to a system having at least one base station capable of forming the antenna beam configurations shown in FIG. 4.

In the exemplary embodiment, cell relationships are determined in which consideration is given to traffic distributions in the cells between which the cell relationships are established. Cell relationships between pairs of cells indicate how communications in one cell of the pair disturb communications in another cell of the pair. In a typical cellular communication system having a plurality of cells, a matrix, G, is formed, having a plurality of elements $G_{ij}$. Each element $G_{ij}$ describes the relationship between a cell i and cell j.

In order to calculate G, signal energy levels of signals detected at the measuring locations 32 are measured. For each measuring location, magnitudes of signal energy levels of downlink signals, such as control signals detected at the plurality of measuring locations are determined. In conventional fashion, different ones of the control channels are defined at different frequencies, and the signal energy levels of the control signals are generated upon the control channels defined at the different frequencies, are measured.

Responsive to such measurements, individual ones of the measuring locations are associated with individual cells and the base stations which define such cells. In the exemplary embodiment, each measuring location is associated with a cell which is defined by a base station generating a downlink signal of greatest signal energy when detected at the measuring location. Associations of the measuring locations to the cells based upon other signal quality indications can similarly be made.

Once an association is made between a measuring location and a particular cell and base station, downlink signals transmitted by other base stations are indications of levels of interference that shall likely be evidenced on traffic channels used during normal telephonic operations. Ratios are determined of signal energy levels of the downlink signals are generated by the base stations with which individual ones of the measuring locations are associated and the signal energy levels of downlink signals forming interfering signals generated by other base stations.

The downlink signal generated by the base station associated with a measuring location shall hereafter be referred to as the carrier signal, and the downlink signals transmitted by others of the base stations shall be referred to as interfering signals with respect to such measuring location. Each element $G_{ij}$ can be a value of C/I, (such as, e.g., 16 dB) as defined at cell i when the downlink transmission generated by the base station which defines the cell j interferes therewith. As shall be noted below, the elements $G_{ij}$ can alternately be other values, such other values responsive in part to the C/I value. For instance, the elements $G_{ij}$ can be probability values (such as, e.g., 3%) indicating probabilities that the C/I value is less than (or greater than) a selected level.

In one embodiment, each measuring location is assumed to have an equal service probability. That is to say, traffic distributions at each of the measuring locations within a particular cell is assumed to carry an equal amount of traffic. When cell relationships are utilized in which such an assumption is made, the cell relationship evaluation is referred to as a disturbed-area, cell relationship evaluation.

In another embodiment, some measuring locations in the cell are determined to have higher service probabilities associated therewith. That is to say, measuring locations positioned in portions of a cell exhibiting higher traffic densities have higher service probabilities associated therewith than measuring locations positioned at areas of a cell exhibiting lower traffic densities. For instance, measuring locations defined in an urban area generally exhibit higher service probabilities than measuring locations positioned in rural areas.

The cell relationship between pairs of cells can, for instance, be selected to be the percentage (portion) of a cell area or traffic in the cell exhibiting a level of C/I lower than a selected value, indicated by a cumulative distribution function. By making such determinations for all cell pairs, the G matrix is formed.

When the cell relationships are utilized for purposes of frequency planning, the cell relationships are utilized when assigning frequencies to the cells. The frequencies are assigned according to the traffic requirements of the particular cells, i.e., the traffic that each cell must be able to serve. The frequency planning procedure is carried out, for example, with the use of an optimization tool in which the cell relationships are utilized for the determination of possible co-channel cells.

Figure 5:
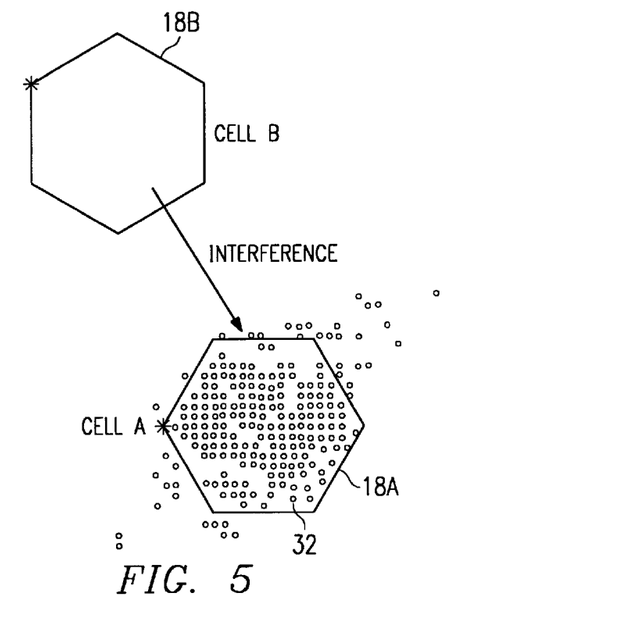
FIG. 5 illustrates two cells of the cellular communication system shown in FIG. 1 in which down link signals broadcast by the radio base station defining a first one of the cells forms interference which interferes with communications in the second one of the cells.

FIG. 5 illustrates two cells 18, here identified by cell 18A and cell 18B of the cellular communication system shown in FIG. 1. The cells 18A and 18B are here nonadjacent cells. For purposes of explanation, the cell 18A shall be the cell whose performance characteristics are to be determined, and the signals generated by the base station defining the cell 18B form interfering signals which interfere with communications within the cell 18A. Measurements are made at each of the measuring locations 32 defined within the cell 18A.

First, indications of actual traffic distributions within a cell are determined. When the antenna apparatus of a radio base station which defines a cell is formed of one of a plurality of narrow lobe antenna beam patterns, such as the lobes 46–54 shown in FIG. 4, an indication of the actual traffic distribution is provided by determining probabilities of traffic being served through each one of the antenna beam patterns. Measurements of such probabilities can be obtained, for instance, by monitoring the amount of time each antenna beam pattern is active.

FIG. 6 illustrates again the cells 18A and 18B, here further illustrating the antenna beam patterns formed by antenna apparatus of radio base stations capable of forming narrow lobe, antenna beam patterns. For instance, a probability vector, $P_A = (P_{a1}, P_{a2}, P_{a3}, P_{a4})$ is defined where $P_{an}$ is the probability of the nth antenna beam pattern being active in cell 18A. A probability vector, $P_B$ is similarly determined at the cell 18B. And, other vectors P are similarly formed at the other cells of the cellular communication system. Sums of the probabilities of the elements forming each probability vector are each collectively of one hundred percent probabilities.

Figure 6:
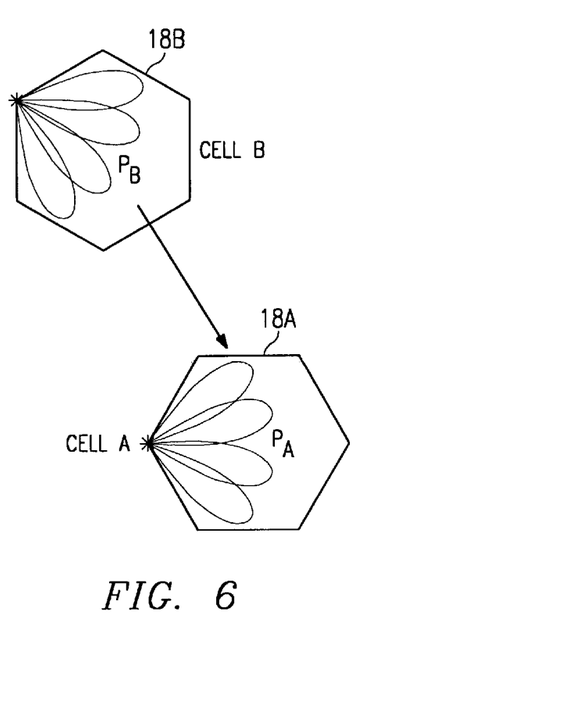
FIG. 6 illustrates two cells, similar to those shown in FIG. 5, here in which the antenna apparatus of the base stations defining both of the first and second cells generate narrow lobe antenna beam patterns.

The values of the elements forming the probability vectors can be formed, for example, by associating a counter, n, with each lobe capable of being exhibited at each of the radio base stations. The designation $n_{ai}$ is the counter for lobe i in cell A. Each time a burst is transmitted using the lobe associated with a counter, the counter is incremented. More than one counter can be concurrently incremented at a base station if, e.g., two separate bursts are concurrently transmitted from a base station or, e.g., two lobes are used to transmit a single burst.

The lobe probability $P_{ai}$, is then the value: $P_{ai} = n_{a1}/(n_{a1} + n_{a2} + n_{a3} + n_{a4})$.

Figure 7:
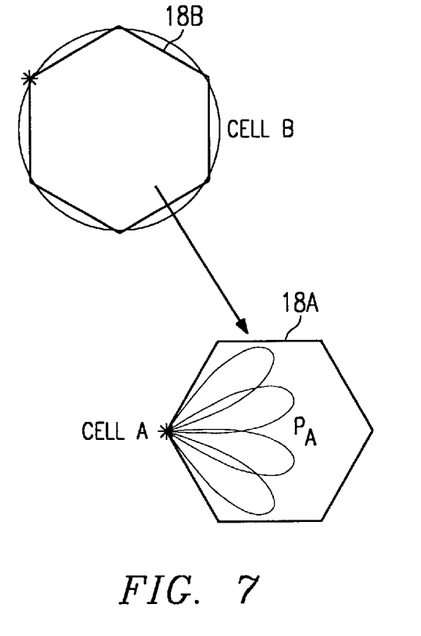
FIG. 7 illustrates the two cells, similar to those shown in FIGS. 5–6, here in which the radio base station of the first one of the cells is defined by a radio base station having antenna apparatus which forms a plurality of narrow lobe antenna beam patterns and in which the radio base station defining the second one of the cells has antenna apparatus which forms a non-changing, wide lobe antenna beam pattern.

FIG. 7 again illustrates two cells 18A and 18B, here in which the antenna apparatus of the radio base station which defines the cell 18B forms a wide lobe, antenna beam pattern while the antenna apparatus of the radio base station of the cell 18A again forms a plurality of narrow lobe, antenna beam patterns. When the probability $P_B$ is determined, the vector is formed of a single value of a one hundred percent probability.

Figure 8:
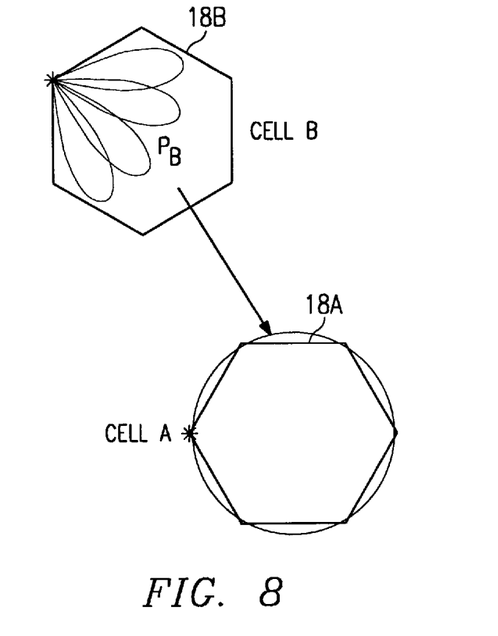
FIG. 8 illustrates two cells, similar to those shown in FIGS. 5–7, but here in which the antenna apparatus of the radio base station which defines the first cell generates a non-changing, wide lobe antenna beam pattern and in which the antenna apparatus of the radio base station which defines the second cell generates a plurality of narrow lobe antenna beam patterns.

FIG. 8 also illustrates two cells, cells 18A and 18B. Here, the antenna apparatus of the radio base station which defines the cell 18A generates a wide lobe, antenna beam pattern. And, the antenna apparatus of the radio base station which defines the cell 18B generates narrow lobe, antenna beam patterns. Here, the vector $P_A$ contains a single element, of value of one.

Signal energy levels are measured at each measuring location defined throughout the area encompassed by the cellular communication system. For downlink signals which can be transmitted pursuant to more than one antenna beam pattern, a separate measurement is made for each of the possible antenna beam patterns throughout which the downlink signal can be transmitted. Once the measurements have been made, individual ones of the measuring locations are associated with individual cells and their associated base stations.

As noted previously, a measuring location, in one embodiment, is associated with the base station which generates a downlink signal of greatest signal energy, when detected at the measuring location. The downlink signal generated by the base station to which a measuring location is associated forms the carrier signal associated with that measuring location. Downlink signals generated by other base stations form interfering signals at that measuring location.

Carrier-to-interference (C/I) ratios are calculated at each measuring location. With reference to the cells 18A and 18B shown in FIG. 9, a C/I vector is calculated for the measuring location X. The measuring location X is served by one antenna beam pattern in the cell 18A. And, the carrier-to-interference ratio at the measuring location X, with reference to the interfering signals generated by the cell 18B, takes one of four separate values. The value of the interfering signal is dependent upon which of the antenna beam patterns is formed by the antenna apparatus of the radio base station of the cell 18B.

Figure 9:
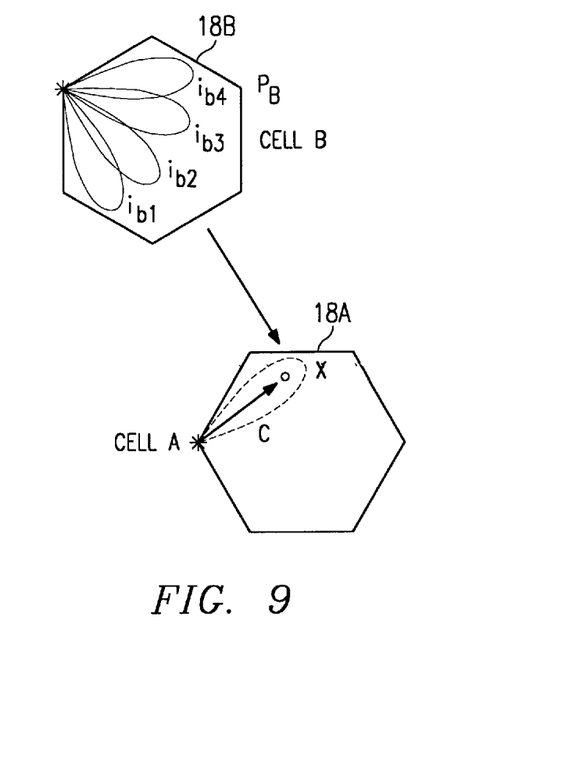
FIG. 9 illustrates two cells, similar to those shown in FIGS. 5–8, here illustrating the broadcast of a down link signal in the first cell throughout an area encompassed by one of the narrow lobe antenna beam patterns.

The interference at the measuring location X caused by downlink signals generated by the radio base station defining the cell 18B forms, thereby, an interference vector, $I_B$, where $I_B = (i_{b1}, i_{b2}, i_{b3}, i_{b4})$. The interference caused by the nth antenna beam pattern of the cell 18B defines the element $i_{bn}$.

The lobe probability $P_B$ associated with the antenna beam patterns of the base station which defines the cell 18B indicates the likelihood of such interference values. The carrier signal associated with the measuring location takes only one value. Thereby, two vectors are associated with the measuring location X. The first vector, $C/I_B$, describes the possible C/I configurations. The second vector, $P_B$, contains the corresponding probabilities of experiencing the C/I configurations. Such measurements are carried out for each measuring location.

A cell relationship is then computed for each pair of cells, such as the cells 18A and 18B. All C/I and P vectors associated with the pixels associated with the cell selected to be analyzed are utilized. The C/I probabilities are, however, known only on a measuring location basis and not on a per cell basis. Transformation of measuring location probabilities to entire-cell probabilities are performed. Such transformations are made by multiplying each P vector with the service probability for the corresponding measuring location. Cell relationships, i.e., values of the elements of the matrix G, are formed.

If antenna apparatus is capable of forming dynamically-shaped lobes rather than fixed, narrow lobe, antenna beam patterns, the P and I vectors are expanded to include all possible angles in their respective cells, such as −60° to +60° in a sector cell.

The service probability, $PS_i$, for each measuring location i is computed. For disturbed area evaluation in which the traffic distribution in a cell is assumed to be equal, $PS_i=1/$ (total number of measuring locations in the cell). Conversely, for disturbed traffic evaluation in which traffic distribution is weighted depending upon the position of the measuring location the service probability, $PS_i$=(the value of $P_A$ for the lobe to which the measuring location is associated)/(the total number of measuring locations allocated to that antenna beam pattern). Thereby, for each measuring location i in cell 18A, a $(C/I_B)_i$ vector and a service probability value $PS_i$ are known. Because there are four (corresponding to the number of antenna beam patterns) C/I values an amended service probability vector is calculated, each one of the four C/I values has a corresponding service probability value. That is to say, $PS_{amended-i}=PS_i \times P_B$. Thus, for instance, the carrier-to-interference value $C/i_{b1}$ (one of the possible C/I values for the measuring location X) occurs in the cell 18A with a probability of $PS_x \cdot P_{b1}$.

A cumulative distribution function (CDF) of the carrier-to-interference ratios is formed from all of the values of the $(C/I_B)_i$ and $PS_{amended-i}$ vectors for all of the measuring locations in the cell 18A.

Figure 10:
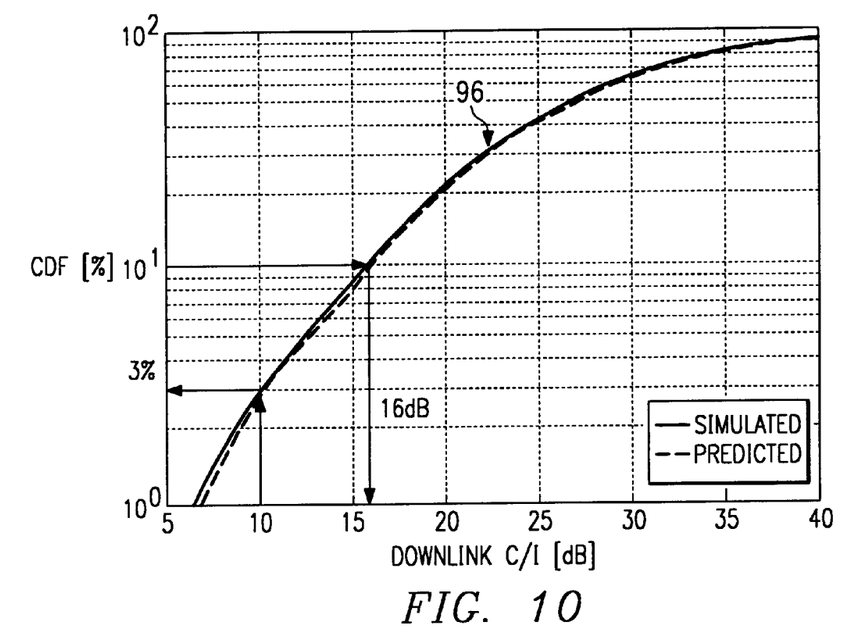
FIG. 10 illustrates a graphical representation of a cumulative density function formed of data collected during operation of an embodiment of the present invention and used to form cell relationships between cells of a cellular communication system.

FIG. 10 illustrates the plot 96 of an exemplary cumulative density function (CDF). As illustrated, the CDF is a function of the values of the downlink C/I values. Values of the plot 96 of the cumulative density function indicate the probability, scaled along the ordinate axis, of the C/I level being beneath a certain level, indicated by the values along the abscissa axis.

Cell relationships are chosen to be specific levels in the cumulative distribution function of the measured carrier-to-interference levels. For instance, in the exemplary representation of FIG. 10, a CDF of ten percent ($10^1$) level corresponds to a C/I level of 16 dB. At such a level, ninety percent of the occasions in which communications are effectuated in the cell 18A, a C/I of larger than 16 dB is experienced. A cell relationship can, alternatively, be determined to be the probability that communications are beneath a selected C/I level. For instance, a C/I level of 10 dB corresponds to a probability of about three percent in the exemplary representation of FIG. 10. Three percent of communications effectuated in the cell 18A have a C/I level beneath 10 dB.

By establishing the cell relationships in each of the cells, the elements of the G matrix are formed. Once such matrix is formed, frequency allocation procedures, as above noted, can be performed.

In another embodiment, the G matrix is used to determine neighbor cell lists. Each cell 18 in the cellular communication system 10 has associated therewith a neighbor cell list. The neighbor cell list specifies the frequencies used in cells neighboring such cell. The manners by which the neighbor cell lists are communicated to mobile terminals is defined in protocols set forth in the appropriate air interface standard. For instance, the GSM air interface standard defines the manners by which the neighbor cell lists are provided to mobile terminals in a GSM system.

A low value of the cell relationship between two cells indicates that the cells are neighbors if cell relationships are defined to be C/I values at selected probability levels. A high value of the cell relationship indicates that the cells are neighbors if the cell relationship is selected to be the probability of being below a selected C/I value. Appropriate designations of allowable, and unallowable, neighbors to individual cells can thereby be assigned.

Figure 11:
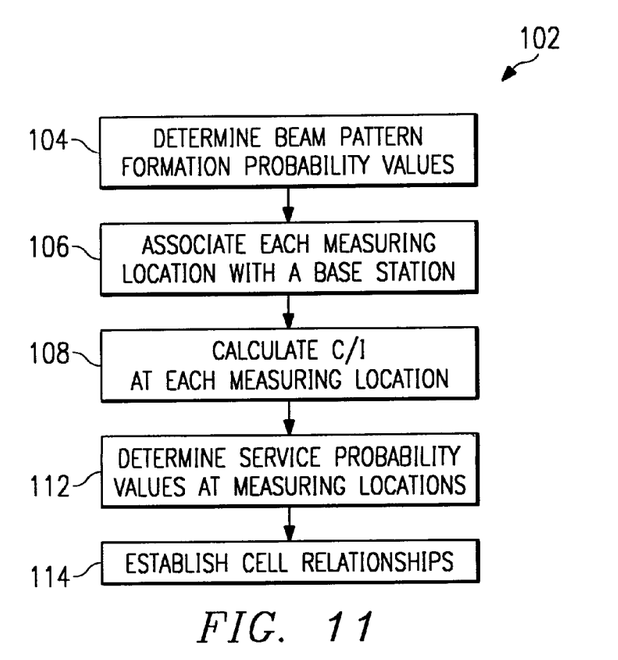
FIG. 11 illustrates a method flow diagram listing the method steps of the method of an embodiment of the present invention.

FIG. 11 illustrates the method, shown generally at 102, of an embodiment of the present invention. The method 102 determines cell relationships in a radio communication system formed of a plurality of radio base stations, each defining a cell.

First, and as indicated by the block 104, beam pattern formation probability values are determined. Such values indicate probabilities of formation of each of the antenna beam patterns formed at each of the base stations.

Then, and as indicated by the block 106, each of the measuring locations is associated with a base station in manners such as those described previously. Such association is effectuated, for example, by first associating each measuring location with a portion of the geographical area encompassed by an antenna beam pattern of the selected number of antenna beam patterns formed by a base station. Then, the portion of the geographical area associated with each measuring location is further associated with the base station at which the antenna beam pattern encompassing the portion of the geographical area is formed.

Then, and as indicated by the block 108, a carrier signal quality indication, such as a C/I ratio, is calculated at each measuring location for each interfering signal thereat. Then, and as indicated by the block 112, service probability values at each measuring location are determined. And, as indicated by the block 114, cell relationships between the cells of the radio communication system are established responsive to values of the carrier signal quality indications and the service probability values.

The previous descriptions are of preferred examples for implementing the invention, and the scope of the invention should not necessarily be limited by this description. The scope of the present invention is defined by the following claims.

What is claimed is:

1. A method for determining cell relationships in a radio communication system formed of a plurality of radio base stations spaced-apart throughout a geographical area, each base station defining a cell, each base station capable of generating a downlink signal broadcast pursuant to an antenna beam pattern, at least one base station further capable of forming a selected number of directional antenna beam patterns throughout which the downlink signal is selectively broadcast, the geographical area further having a plurality of measuring locations defined throughout, said method comprising the steps of:

determining beam pattern formation probability values indicating probabilities of formation of each of the antenna beam patterns formed at each of the base stations;

associating each of the measuring locations with a base station, the downlink signal generated by the base station with which each of the measuring locations, respectively, is associated forming a desired carrier signal associated with each respective measuring location, downlink signals generated by others of the base stations forming interfering signals at the respective measuring locations;

calculating a carrier signal quality indication relative to each interfering signal detected at each measuring location, a separate value calculated for each of the antenna beam patterns throughout which each of the interfering signals is broadcast;

determining service probability values at each measuring location indicating service probabilities at each measuring location that the desired carrier signal associated therewith is broadcast to the measuring location; and establishing cell relationships between the cells of the radio communication system responsive to values of the carrier signal quality indication calculated during said step of calculating, and the service probability values determined during said step of determining the service probability values.

2. The method of claim 1 wherein said step of determining the service probability values comprises associating a measuring-location service probability with each of the measuring locations and calculating a service probability value associated with each of the antenna beam patterns by combining the measuring-location service probability with beam pattern formation probability values associated with each of the antenna beam patterns.

3. The method of claim 2 wherein the measuring-location service probabilities of the measuring locations associated with individual ones of the base stations are of equal values.

4. The method of claim 2 wherein the measuring-location service probabilities of the measuring locations associated with the at least one base station capable of forming the selected number of directional antenna beam patterns are of values related to corresponding beam pattern formation probability values determined during said step of determining the beam pattern formation probability values.

5. The method of claim 2 wherein sums of the service probability values of the measuring locations associated with individual ones of the base stations form one hundred percent probabilities.

6. The method of claim 1 wherein the beam patterns formation probability values of the selected number of antenna beam patterns capable of being formed at the at least one base station together form one hundred percent probabilities.

7. The method of claim 1 wherein the service probabilities determined during said step of determining service probability values are of equal values.

8. The method of claim 1 comprising the further step of allocating frequencies to be used to effectuate communications with the base stations responsive to the cell relationships established during said step of establishing the cell relationships.

9. The method of claim 1 wherein the directional antenna beam patterns of which the at least one base station is capable of generating comprise a selected number of fixed antenna beam patterns, and wherein sums of the beam pattern formation probability values determined during said step of determining the beam pattern formation probability values of the selected number of fixed antenna beam patterns form one hundred percent probabilities.

10. The method of claim 1 comprising the further intermediary step of measuring, at each of the measuring locations, signal characteristics of the downlink signals generated by each of the base stations, and wherein allocations made during said step of associating are made responsive to the signal characteristics made during said step of measuring.

11. The method of claim 10 wherein the signal characteristics measured during said step of measuring comprise signal energy levels of the downlink signals.

12. The method of claim 11 wherein the associations of each of the measuring locations made during said step of associating are made to the base stations which exhibit greatest signal energy levels at the respective measuring locations.

13. The method of claim 12 wherein the cell relationships established during said step of establishing comprise desired carrier signal-to-interfering signal ratios being of a selected probability level.

14. The method of claim 12 wherein the carrier signal quality indications generated during said step of calculating combine values of ratios of signal energy levels of the carrier signals defined at the respective measuring locations relative to signal energy levels of the interfering signals.

15. The method of claim 12 wherein the cell relationships established during said step of establishing the cell relationships comprise probabilities of the ratios being less than a selected threshold level.

16. The method of claim 1 wherein the directional antenna beam patterns of which the at least one base station is capable of generating comprise a selected number of dynamically-selectable antenna beam patterns and wherein the beam pattern formation probability values determined during said step of determining the beam pattern formation probability values comprise the probabilities of formation of each of the selected number of dynamically-selectable antenna beam patterns, sums of the probabilities of formation of the selected number of dynamically-selectable antenna beam patterns forming one hundred percent probabilities.

17. The method of claim 1 further comprising the intermediacy steps, prior to said step of associating each of the measuring location with a base station of:

associating each measuring location with a portion of the geographical area encompassed by an antenna beam pattern of the selected number of beam patterns formed at the at least one base station; and associating the portion of the geographical area associated with each measuring location with the base station at which the antenna beam pattern encompassing the portion of the geographical area is formed.

18. A method for determining cell relationships in a radio communication system formed of a plurality of base stations spaced-apart throughout a geographical area, each base stations defining a cell, each base station capable of generating a downlink signal broadcast pursuant to an antenna beam pattern and at least one of the plurality of base stations further capable of forming a selected number of directional antenna beam patterns throughout which the downlink signal is transmitted, the geographical area further having a plurality of measuring locations defined throughout, said method comprising the steps of:

determining probabilities at each base station of formation of each of the selected number of directional antenna beam patterns capable of being formed thereat;

measuring, at each of the measuring locations, the downlink signals generated by each of the base stations when forming each of the selected number of antenna beam patterns;

assigning each of the measuring locations to a base station, the downlink signal generated by the base station to which each of the measuring locations is assigned forming a desired carrier signal associated with each respective measuring location, downlink signals generated by others of the base stations forming interfering signals associated with each of the respective measuring locations;

calculating a value of a carrier signal-to-interfering signal ratio for each interfering signal detected at each measuring location, a separate value calculated for each of the antenna beam patterns throughout which each of the interfering signals is broadcast;

determining service probability values at each measuring location indicating service probabilities at each measuring location that the desired carrier signal associated therewith is broadcast to the measuring location; and establishing cell relationships responsive to at least the values of the carrier signal-to-interfering signal ratio calculated during said step of calculating and the service probabilities determined during said step of determining the service probability values.

19. Apparatus for determining cell relationships in a radio communication system formed of a plurality of base stations spaced-apart throughout a geographical area, each base station defining a cell, each base station capable of generating a downlink signal broadcast pursuant to an antenna beam pattern, at least one base station further capable of forming a selected number of directional antenna beam patterns throughout which the downlink signal is selectively broadcast, the geographical area further having a plurality of measuring locations defined throughout, said apparatus comprising:

a beam pattern probability determiner coupled to receive indications of the antenna beam patterns of which each of the base stations is capable of forming, said beam pattern probability determiner for determining probabilities at each base station of formation of each of the antenna beam patterns capable of being formed thereat;

an assigner coupled to receive indications of signal characteristics of the downlink signals generated by each of the base stations and broadcast throughout areas encompassed by each of the antenna beam patterns, said assignor for assigning each of the measuring locations to a base station, the downlink signal generated by the base station to which each of the measuring locations, respectively, is assigned forming a desired carrier signal associated with each respective measuring location, downlink signals generated by others of the base stations forming interfering signals at the respective measuring locations;

a calculator coupled to receive indications of the assignments made by the assigner and indications of the carrier signals and interfering signals at each of the measuring locations, said calculator for calculating a carrier signal quality indication relative to each interfering signal detected at each measuring location, a separate value calculated for each of the antenna beam patterns throughout which each of the interfering signals is broadcast;

a service probability determiner for determining service probability values at each measuring location that the desired carrier signal associated therewith is broadcast to the measuring location; and a cell relationship determiner operable responsive at least to values of the carrier signal quality indication calculated by said calculator and the service probability values determined by said service probability determiner, said cell relationship determiner for determining cell relationships between the cells of the radio communications system.

20. The apparatus of claim 19 further comprising a frequency allocator operable responsive to the cell relationships determined by said cell relationship determiner, said frequency allocator for allocating frequencies to be used to effectuate communications with the base stations.

21. The apparatus of claim 19 further comprising a signal strength measurer positionable to detect at the measuring locations signal strengths of the downlink signals generated by the base stations, and wherein the indications of the signal characteristics to which said assignor is coupled to receive comprises indications of the signal strengths measured by said measurer.

22. In network infrastructure of a radio communication system formed of a plurality of radio base stations spaced-apart throughout a geographical area, each base station defining a cell, each base station capable of generating a downlink signal broadcast pursuant to an antenna beam pattern, at least one base station further capable of forming a selected number of directional antenna beam patterns throughout which the downlink signal is selectively broadcast, the geographical area further having a plurality of measuring locations defined throughout, an improvement of antenna beam patterns logging apparatus for recording data pertaining to antenna beam patterns formed by the base stations, said apparatus comprising:

a detector coupled to receive indications of the antenna beam patterns formed by the base stations, said detectors for detecting when the antenna beam patterns are formed by the base stations; and a storage element coupled to said detector, said storage element for recording data indicative of which antenna beam patterns are formed by the antenna beam patterns and time periods during which the antenna beam patterns are formed.

23. The apparatus of claim 22 further comprising a probability determiner operable responsive to the data stored by said storage element, said probability determiner for determining probabilities of formation of each of the antenna beam patterns by the base stations.

* * * * *